United States Patent [19]

Cooke et al.

[11] Patent Number: 5,283,849
[45] Date of Patent: Feb. 1, 1994

[54] OPTICAL CONNECTOR PREASSEMBLY

[75] Inventors: Terry L. Cooke, Hickory; Mark W. Spriggle, Taylorsville, both of N.C.

[73] Assignee: Siecor Corporation, Hickory, N.C.

[21] Appl. No.: 11,589

[22] Filed: Feb. 1, 1993

[51] Int. Cl.5 ................................................. G02B 6/36
[52] U.S. Cl. ............................................ 385/77; 385/84
[58] Field of Search ................... 385/77, 78, 81, 84, 385/99, 138, 139

[56] References Cited

U.S. PATENT DOCUMENTS

| | | | |
|---|---|---|---|
| 4,674,833 | 6/1987 | Des Forges et al. | 385/84 |
| 4,834,487 | 5/1989 | Abendschein et al. | 385/78 |
| 4,846,545 | 7/1989 | Estabrook et al. | 350/96.21 |
| 4,902,095 | 2/1990 | Baker et al. | 350/96.21 |
| 4,979,792 | 12/1990 | Weber et al. | 350/96.20 |
| 5,076,656 | 12/1991 | Briggs et al. | 385/71 |

Primary Examiner—Rodney B. Bovernick
Assistant Examiner—John Ngo
Attorney, Agent, or Firm—J. David Abernethy

[57] ABSTRACT

Disclosed is an installation fixture for preassembly of a portion of a fiber optic connector. The fixture can be separately assembled including a ferrule, a ferrule holder, coupling hardware, and heat shrinkable tubing to seat an optical fiber during curing.

3 Claims, 6 Drawing Sheets

OPTICAL CONNECTOR PREASSEMBLY

BACKGROUND OF THE INVENTION

The field of the invention is fiber optic connectors.

Fiber optic connectors serve an increasingly important role in the light waveguide network as the network expands from the central distribution office towards the subscriber. Connectors allow portions of the network to be reconfigured quickly as conditions change. Connectors are also used in distribution boxes holding multiple connectors so that rerouting can occur at a single location.

Problems which can occur during manufacture of fiber optic connectors include the possible unseating of an optical fiber during heat curing of adhesive within a connector. Current design approaches also call for assembly of the entire connector in one operation, which can cause the entire operation to be delayed during curing of a connector batch.

Therefore, it is believed that the art would be advanced by a connector preassembly which can be assembled separately from the production process using the actual light waveguides, and which further includes means for reliable seating of the light waveguide during curing of the connector adhesive.

SUMMARY OF THE INVENTION

These improvements are achieved by the connector preassembly according to the invention. A rigid tubular ferrule holder is provided with a slotted outer flange between first and second terminal ends of the ferrule holder. The first ferrule holder terminal end holds a light waveguide ferrule and heat shrinkable tubing is secured over the second end of the ferrule holder.

A coil spring and then a rigid tubular latching body are placed over the heat shrinkable tubing and placed adjacent to the ferrule holder flange. The latching body is provided with an outer flange between first and second latching body terminal ends. The first latching body terminal end is provided with first engagement means, including a tongue, pawls, or the like, which engage the slotted outer flange of the ferrule holder to prevent rotation of the latching body with respect to the ferrule holder. The latching body first terminal end is also provided with a second engagement means for engaging a rigid tubular end member. The second terminal end of the latching body is outwardly knurled to allow hand assembly and disassembly of the apparatus.

A rigid tubular end member, sometimes called a shroud and sometimes called a plug frame depending upon the particular fiber optic connector design utilized, is provided with an outer flange and a terminal end having a third engagement means for engaging the second engagement means of the latching body. The second and third engagement means may include inter-engaging threads. Finally, a rigid tubular outer member (a coupling nut in the preferred embodiment) is carried between the outer flanges of the latching body and the rigid tubular end member.

After the preassembly apparatus is completed and at such time and place as is convenient, a light waveguide in a buffer tube is stripped at one terminal end, the bare light waveguide being inserted up the heat shrinkable tubing into the interior of the ferrule. The light waveguide is secured within the ferrule by adhesive or the like. The assembly is then cured for a desired period of time to set the adhesive within the ferrule and shrink the tubing over the light within the ferrule and shrink the tubing over the light waveguide buffer tube.

BRIEF DESCRIPTION OF THE DRAWINGS

The preferred embodiment is described with reference to the drawings, in which.

DETAILED DESCRIPTION OF THE PREFERRED EMBODIMENT

Figure 1:
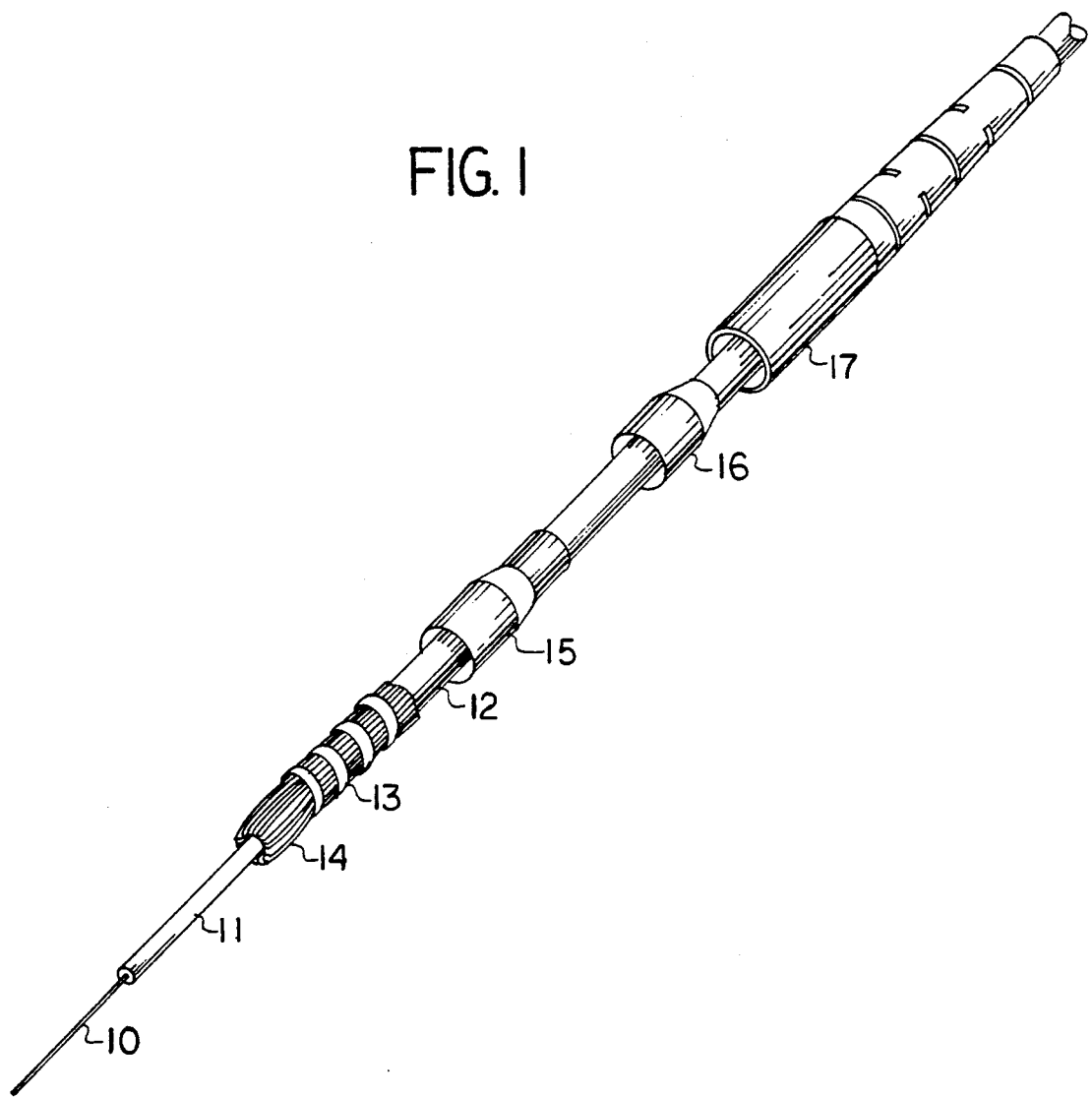
FIG. 1 is a perspective view of a light waveguide which has been prepared for connectorization.

The particular connector described in the detailed description and the drawing is an embodiment suitable for use with the FC connector. The invention within the scope of the claims may be used for other connector types as well, as desired.

In order to prepare a light waveguide as shown in FIG. 1 to be used for insertion into the connector preassembly as herein described, segmented boot 17, jacket crimp band 16, and aramid fiber crimp band 15 are inserted over the terminal end of outer cable jacket 12. The segments of boot 17 can be cut away as necessary for hardware compatibility. A distance from the end of cable jacket 12 is marked with the desired length to be removed and a portion of outer cable jacket 12 is then removed with a suitable stripping tool. The exposed aramid fiber 14 is not cut, but is folded back over cable jacket 12 and secured by a short piece of spiral tubing 13. Buffer tube 11 is then marked and a desired length such as 19 mm is stripped to reveal light waveguide 10 therein. The prepared light waveguide cable is then as shown in FIG. 1.

Figure 2:
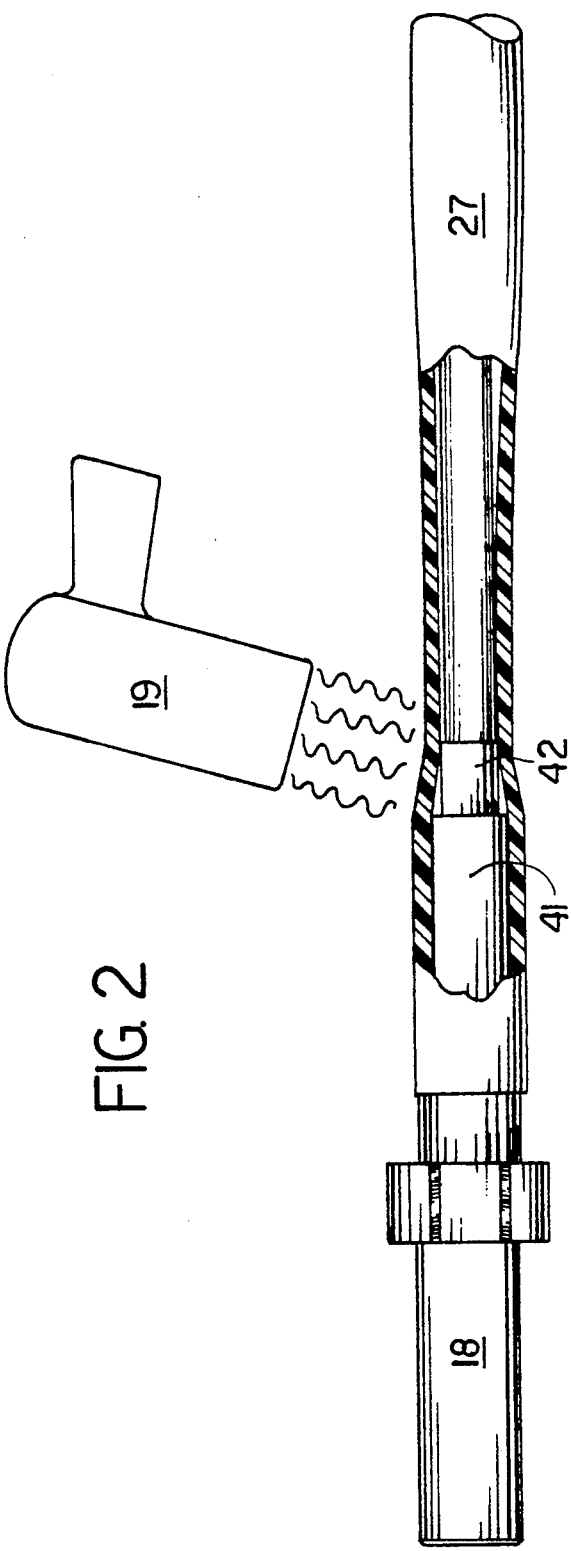
FIG. 2 is a partially cut away side view of the application of heat shrinkable tubing to a ferrule holder.
Figure 3:
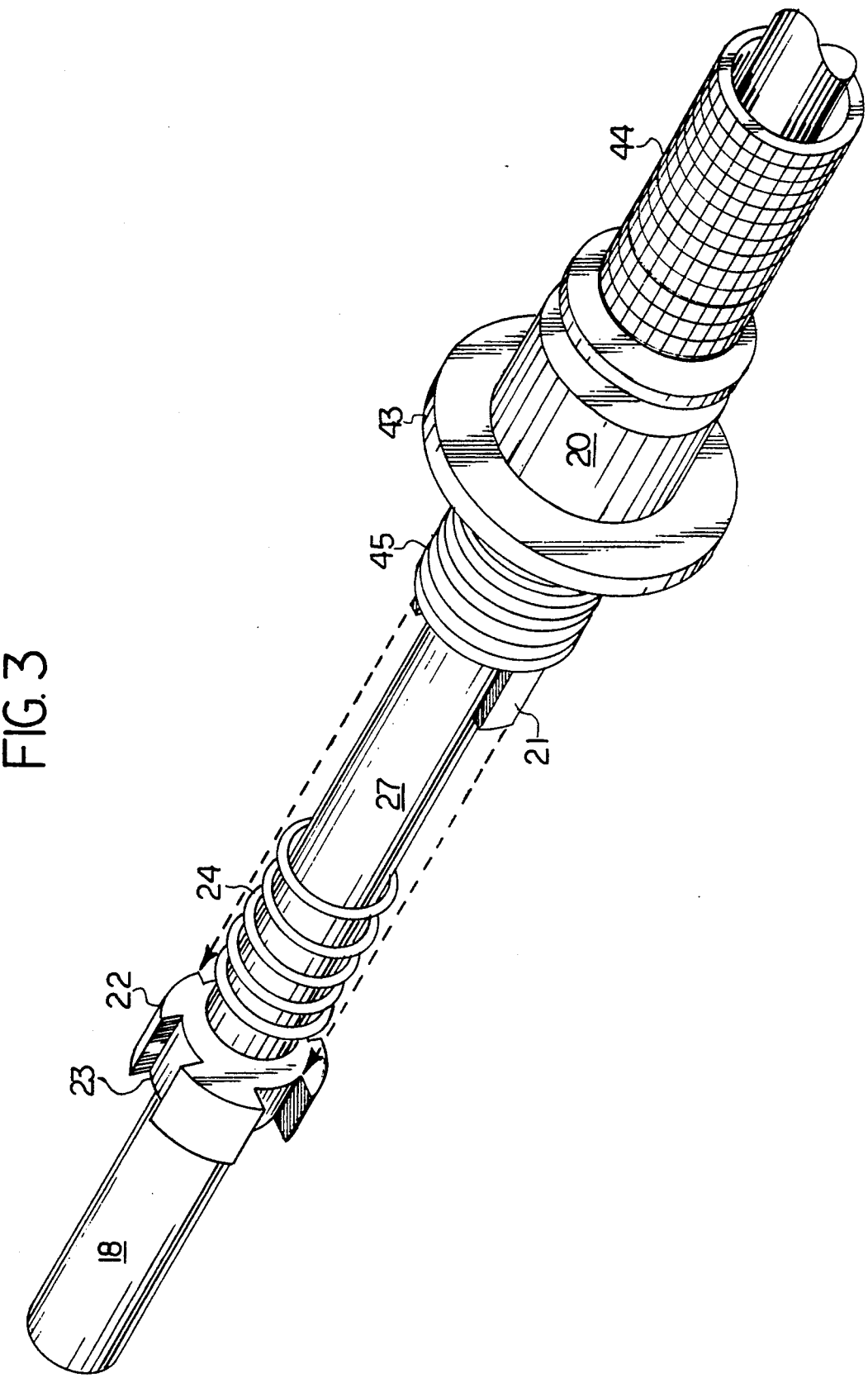
FIG. 3 is a perspective view of the insertion of a coil spring and a latching body over the elements in FIG. 2.
Figure 4:
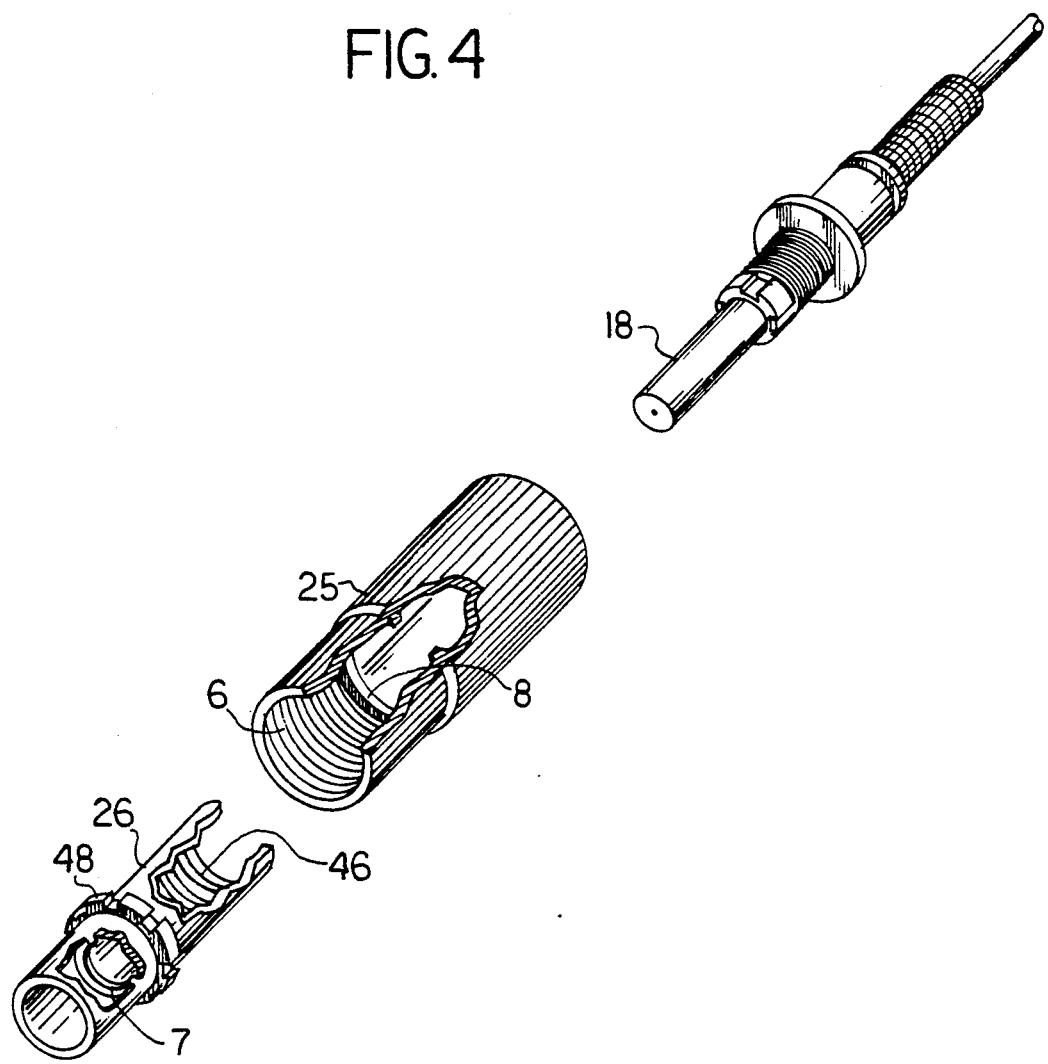
FIG. 4 is a partially cutaway perspective view of a coupling nut and shroud to be inserted over the apparatus of FIG. 3.

The connector preassembly as follows can take place separately from the foregoing procedure. As illustrated in FIGS. 2 and 3, light waveguide ferrule 18 is held by a rigid tubular ferrule holder 41 having an outer flange 22 with slots 23 therein. A piece of heat shrinkable tubing 27 is now cut to a desirable length such as 22 mm. Tubing 27 is then inserted over the stepped rear portion 42 of ferrule holder 41 until tubing 27 seats against a shoulder of ferrule holder 41 a short distance from outer flange 22 as shown in FIG. 2. A 900 micron diameter rod is then inserted inside tubing 27 until it seats flush to the rear of stepped portion 42. A heat gun 19 is then used to melt tubing 27 over ferrule holder 41. The rod is then removed and coil spring 24 and rigid tubular latching body 20 are then inserted over tubing 27 in the direction shown in FIG. 3. Latching body pawls 21 are inserted into slots 23 of ferrule holder flange 22. Latching body 20 is provided with an outer flange 43 between a knurled portion 44 and an outwardly threaded portion 45. A drop of epoxy is applied to threads 45. Turning to FIG. 4, coupling nut 25 having an inner flange 8 and inwardly threaded portion 6 along with a shroud having a slotted outer flange 48, inner threads 46, and an inward flange 7 are inserted over ferrule 18. Threads 45 of latching body 20 and threads 46 of shroud 26 are then screwed together by turning knurled portion 44 of latching body 20. During this operation, pawls 21 must remain within slots 23. The connector preassembly has then been completely assembled.

Figure 5:
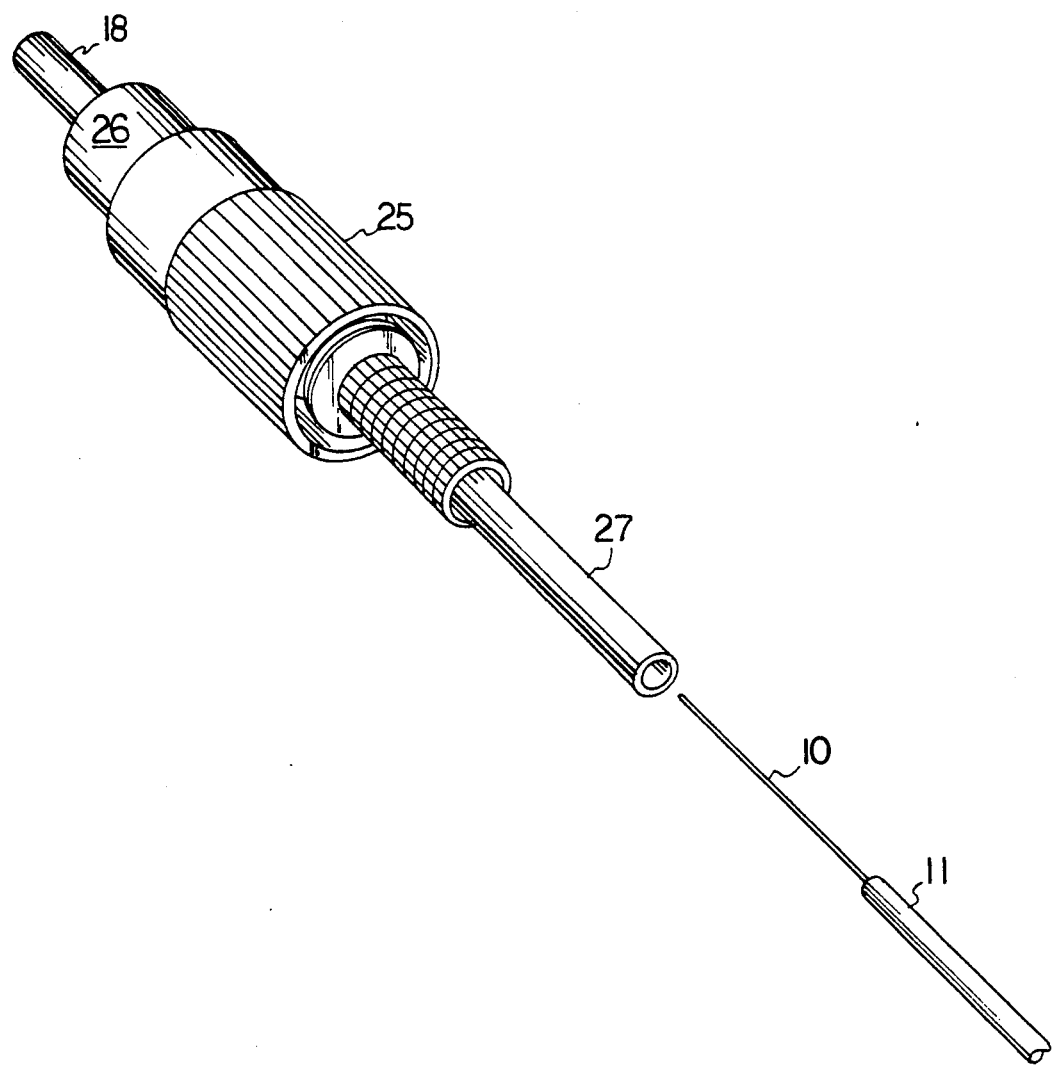
FIG. 5 is a perspective view of the insertion of the prepared light waveguide into the completed preassembly; and, FIG. 6 is a perspective view of the connector as fully assembled.
Figure 6:
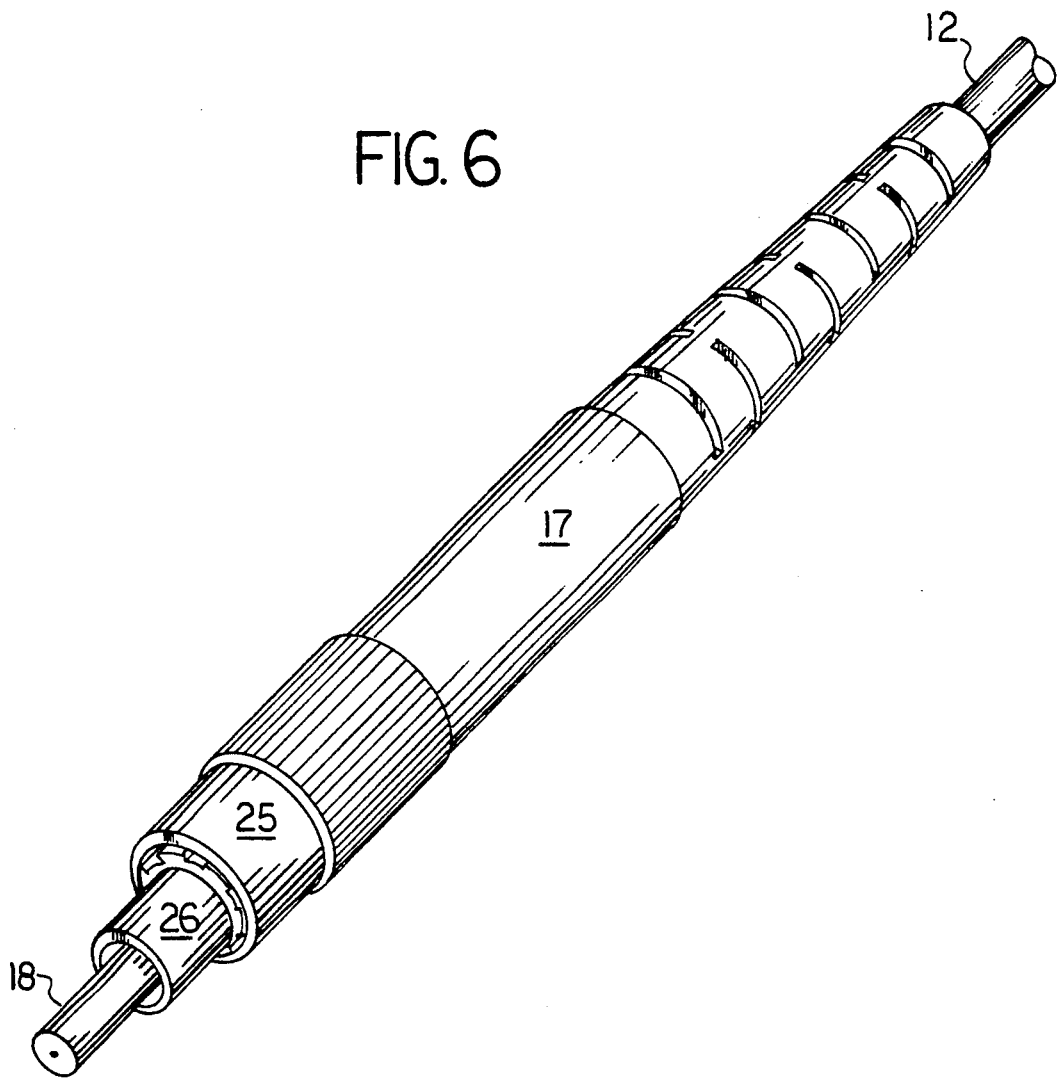

Light waveguide installation is now shown in FIG. 5, a combination of the apparatus described in FIG. 4 and in FIG.. 1. Light waveguide distal end 10 and ferrule 18 are cleaned and epoxy is applied using a syringe to the interior of ferrule 18. The syringe needle is also used to coat light waveguide tip 10 with a thin layer of epoxy. Light waveguide 10 is then inserted up tubing 27 until the distal end of light waveguide 10 is flush with the distal end of ferrule 18. The entire assembly is then placed in a holding rack and the entire assembly is cured at 100° C. for 20 minutes.

After the assembly has been cured, spiral tubing 13 is removed and aramid fiber 14 is trimmed flush with the forward portion of knurled area 44 of latching body 20. The distal end of cable jacket 12 is then slit 3 to 4 mm in two places 180° apart. Aramid fiber crimp band 15 is then moved over aramid fiber 14 until aramid fiber crimp band 15 contacts latching body outer flange 43. Kevlar crimp band 15 is then crimped over aramid fiber 14 against latching body 20 using a crimping tool. The distal end of outer jacket 12 is then placed around the rearward portion of jacket crimp band 16 and outer cable jacket 12 is then crimped over the rearward portion of jacket band 16. Segmented boot 17 is then placed over latching body 20, and the assembly is now ready for polishing.

What is claimed is:

1. Apparatus used in an optical connector assembly, comprising:
    a rigid tubular ferrule holder having a slotted outer flange between first and second holder terminal ends, a light waveguide ferrule on the first holder terminal end and heat shrinkable tubing secured over the second holder terminal end;
    a rigid tubular latching body carried on the heat shrinkable tubing and having an outer flange between an outwardly threaded first latching body terminal end and an outwardly knurled second latching body tubular end, said outwardly threaded first latching body terminal end having a tongue engaging the slotted outer flange of the ferrule holder to prevent rotation of the latching body with respect to the ferrule holder;
    a coil spring carried on the ferrule holder over the heat shrinkable tubing;
    a rigid tubular shroud having an outer flange and an inwardly threaded terminal end engaging the outwardly threaded first latching body terminal end; and,
    a rigid tubular coupling nut carried between the outer flanges of the latching body and the shroud.

2. Apparatus as recited in claim 1 further comprising a buffer tube holding a light waveguide, the buffer tube secured by curing the heat shrinkable tubing thereover and the light waveguide secured within the light waveguide ferrule.

3. Apparatus used in an optical connector assembly, comprising:
    a rigid tubular ferrule holder having a slotted outer flange between first and second holder terminal ends, a light waveguide ferrule on the first holder terminal end and heat shrinkable tubing secured over the second holder terminal end;
    a rigid tubular latching body carried on the heat shrinkable tubing and having an outer flange between a first latching body terminal end and an outwardly knurled second latching body terminal end, said first latching body terminal end having first engagement means for engaging the slotted outer flange of the ferrule holder to prevent rotation of the latching body with respect thereto and a second engagement means;
    a coil spring carried on the ferrule holder over the heat shrinkable tubing;
    a rigid tubular end member having an outer flange and a terminal end having third engagement means for engaging the second engagement means of the latching body; and,
    a rigid tubular outer member carried between the outer flanges of the latching body and the rigid tubular end member.

* * * * *